United States Patent Office 3,586,621
Patented June 22, 1971

3,586,621
HYDROCARBON STEAM REFORMING, CONVERSION AND REFINING
Armin C. Pitchford, Darrell W. Walker, and Marvin M. Johnson, Bartlesville, Okla., assignors to Phillips Petroleum Company
No Drawing. Filed Sept. 3, 1968, Ser. No. 757,113
Int. Cl. C10g 13/04
U.S. Cl. 208—112        3 Claims

ABSTRACT OF THE DISCLOSURE

Heavy hydrocarbon oils, residual fractions and other carbonaceous materials are converted to useful liquid products by contacting with a nickel spinel catalyst promoted with a barium salt of an organic acid.

BACKGROUND OF THE INVENTION

This invention relates to the production of liquid products as well as gaseous products containing methane from heavy hydrocarbon-containing feedstocks. In accordance with another aspect, this invention relates to the conversion of heavy hydrocarbon oils and residual hydrocarbon fractions as well as solid carbonaceous materials to highly useful gaseous and liquid products by contacting with a barium promoted nickel spinel catalyst. In accordance with a further aspect, this invention relates to the conversion of heavy hydrocarbons to useful products by contacting with a barium acetate treated nickel spinel catalyst in the presence of steam. In accordance with a further aspect, this invention relates to a novel nickel spinel catalyst promoted with a barium salt of an organic acid.

The presence of sulfur, nitrogen and oxygen compounds in crude oils and various refined petroleum products has long been considered undesirable. Because of their disagreeable odor, corrosive characteristics and combustion products (particularly $SO_2$), sulfur removal has been of constant concern to the petroleum refiner. This has led in the past to the selection of low-sulfur crudes whenever possible. With the necessity of utilizing the heavy, high sulfur crude oils in the future, economical desulfurization processes are essential. This need is further emphasized by recent and proposed legislation which seeks to limit sulfur contents of industrial, domestic and motor fuels.

While numerous methods are available to industry for the removal of sulfur, those processes which employ hydrogen are preferred. However, such hydrodesulfurization processes require extensive capital investment. The primary investment cost is the hydrogen generation and compression facilities. Consequently, a decided economic advantage could be realized if this step could be eliminated. One of the most effective means for accomplishing this objective is the use of a bifunctional catalyst system. A dual-purpose catalyst is one which is used to generate hydrogen in situ from steam by the water-gas reaction of a hydrocarbon or coke to produce CO, $CO_2$ and $H_2$. The hydrogen is then consumed as it is produced to catalytically convert sulfur compounds in the crude oil or other petroleum fractions to $H_2S$ and lower molecular weight hydrocarbons.

Accordingly, an object of this invention is to provide a new and improved catalyst useful for the conversion of heavy hydrocarbon fractions and solid carbonaceous materials to valuable gaseous and liquid products.

Another object of this invention is to provide a new and improved catalyst having increased catalyst life useful for the steam reforming of heavy hydrocarbons to useful gaseous and liquid products.

Other aspects, objects, as well as the several advantages of this invention will be apparent to one skilled in the art upon study of this disclosure and the appended claims.

SUMMARY OF THE INVENTION

According to the invention, a process is provided for the production of valuable gaseous and liquid products from heavy hydrocarbon-containing feedstocks and other carbonaceous materials which comprises contacting said feedstock and steam with a nickel spinel catalyst promoted with a barium salt of an organic acid such as barium acetate.

Further, in accordance with the invention, a novel and improved catalyst useful for the conversion of heavy hydrocarbon-containing feedstocks to valuable gaseous and liquid products is provided which comprises a barium promoted nickel aluminate catalyst.

PREFERRED EMBODIMENTS

The catalytic steam-reforming process of this invention is applicable to a feedstock containing aliphatic and aromatic hydrocarbons as well as acyclic and alicyclic, paraffinic and olefinic organic compounds such as those containing up to 40 or more carbon atoms per molecule or molecular weights as high as 500 and more. Feedstock can be a single hydrocarbon or mixtures of hydrocarbons including various petroleum fractions such as light naphtha, having a boiling range of about 100–250° F., heavy naphthas, which have a boiling range of 200–400° F., gas oil, for example, boiling in the range 400–700° F., as well as mineral oils, crude petroleum, including topped and residual oils, coal and other materials.

The reforming temperature employed can vary appreciably but preferably will be in the range 600–1000° F. The reaction pressure will ordinarily be 200 to 3000 p.s.i.g., but higher pressures can be used to advantage in certain instances. The water to hydrocarbon liquid volume ratio is ordinarily at least 0.1 to 1, generally in the range 0.25/1 to 1/1. The total liquid hourly space velocity (LHSV) ordinarily ranges from 0.2 to 10.0 volumes of liquid feed per volume of catalyst per hour.

Generally, when sulfur-containing feeds are employed, steam requirements are more severe than when sulfur-free feedstocks are utilized, sulfur tending to cause a rapid decline in the selectivity of standard catalysts and promote carbon lay-down on the catalyst. The process of the present invention can be used to reform hydrocarbon fractions containing from about 50 p.p.m. to about 8 weight percent sulfur. If desired, the addition of hydrogen can be used when the feed contains sulfur compounds.

As indicated above, the catalytic component of the invention is nickel aluminate ($NiAl_2O_4$) or also known as nickel spinel. The catalyst of the invention, i.e., nickel spinel, is promoted with barium salt of an organic acid and the amount of barium added ranges from one to 10 weight percent based on the total weight of catalyst.

The nickel spinel catalyst can be prepared by any of the procedures known to the industry. The barium promoter can be added before, during or after a preparation of the nickel spinel and can be added in the form of any salt of an organic acid or hydroxy substituted organic acid that is soluble in water or an organic solvent.

Examples of barium salt that can be used are the formate, acetate, propionate, butyrate, caproate, malate, gluconate, benzoate, salicylate, mandelate, cinnamate and the like.

A presently preferred method for preparing the catalyst of the invention is to prepare the nickel spinel and then to impregnate the nickel aluminate with a solution of a barium salt of an organic acid and dry. For use in fixed bed operation, the catalyst can be granulated or pelleted at any suitable point during the preparation such as after the formation of the nickel spinel or after the formation of the barium promoted nickel spinel. For use in fluidized or ebullient bed operations pelleting is unnecessary, but the the particle size must be such that fluidization or ebullition can be attained at the desired hydrocarbon and steam feed rates.

The liquid products resulting from the reforming operation of the invention usually produces materials having the following characteristics:

| | |
|---|---|
| API gravity | 25–50 |
| Sulfur, wt. percent | 0.5–1.75 |
| Carbon residue (Ramsbottom), percent | .25–10 |
| Bromine number | 10–30 |
| Boiling range, °F. | 100–1000 |

The gaseous products obtained from the reformate according to the invention will ordinarily have the following composition:

| | Mol percent |
|---|---|
| Hydrogen | 17–85 |
| $H_2S$ | 1–8 |
| $CO_2$ | 1–10 |
| $C_1$ | 2–50 |
| $C_2$'s | 5–25 |
| $C_3$'s | 2–25 |
| $C_4$'s | 2–15 |
| $C_5$'s+ | 2–15 |

Product distribution in both gas and liquid phases will vary with the particular feedstock and the extent of conversion.

SPECIFIC EXAMPLE

A barium promoted nickel aluminate catalyst was used for the steam conversion of heavy crude oils and residual fractions. The activity of the barium promoted nickel aluminate was compared to a barium promoted nickel catalyst on an alumina support.

The nickel aluminate catalyst was prepared in a two-step procedure. The solution of aluminum nitrate [Al $NO_3)_3 \cdot 9H_2O$] and nickel nitrate ($NiNO_3 \cdot 6H_2O$) was adjusted to pH 7 by the addition of ammonium hydroxide. The resulting gel was washed, dried and calcined at 1600° F. X-ray examination of a fraction of this calcined product indicated that the resulting material was $NiAl_2O_4$ and contained some spinel structure. The $NiAl_2O_4$ catalyst was impregnated with barium acetate to give the catalyst designated A with about six weight percent barium which was dried and calcined at 1200° F.

Composition and properties of catalyst used in the comparative tests are shown in the following tabulation.

| | Catalyst designation | |
|---|---|---|
| | A | B |
| Base material | $NiAl_2O_4$ | $Al_2O_3$ |
| Nickel, weight percent | 23.0 | 11.6 |
| Barium, weight percent | 6.3 | 10.0 |
| Surface area, M.²/gram | 78.5 | 53.9 |
| Pore volume, cc./gram | 0.23 | 0.31 |
| Pore diameter, A | 116 | 234 |

Runs were made over the preceding catalysts with the same feedstock which comprised a 50–50 blend of Middle East crude oils from the Eocene and Ratawi formations of the Wafra field. Results of these tests are summarized in the attached Table I.

It can be seen from the data in Table I that Catalyst A, the nickel aluminate promoted with barium, was active after 17 hours of operation as determined by the extent of sulfur removal (22 percent) and the carbon residue of the converted crude oil. After regeneration, activity of the catalyst was restored for an operation period of 11 hours.

The barium promoted nickel impregnated catalyst on an alumina support (Catalyst B), the control catalyst, showed a marked decline in activity after 7½ hours as evidenced by plugging and a drastic reduction in the yield of gaseous material. Upon regeneration activity could be maintained only for about 8 hours by increasing the reaction temperature to 918° F.

While both catalysts are promoted with barium and have the same formula weight upon calcination, it is noted that Catalyst A is comprised of a single compound, i.e., $NiAl_2O_4$. Catalyst B on the other hand is comprised of two compounds, NiO and $Al_2O_3$. The barium exists as BaO on both catalyst surfaces.

TABLE I.—STEAM CONVERSION OF EOCENE-RATAWI CRUDE OIL OVER NICKEL ALUMINATE AND NICKEL IMPREGNATED ALUMINA AFTER ACTIVATION WITH BaO

| | Catalyst | | | | | | | | | | | Eocene-Ratawi feed stock |
|---|---|---|---|---|---|---|---|---|---|---|---|---|
| | A. Barium promoted nickel aluminate spinel | | | | | | | B. Barium promoted nickel on alumina | | | | |
| | 1 | 2 | 3 | 4 | 5 | 6 | 7 | 8 | 9 | 10 | 11 | |
| Operating conditions: | | | | | | | | | | | | |
| Temperature, F | 738 | 816 | 795 | 908 | 803 | 865 | 881 | 868 | 910 | 870 | 918 | |
| Time catalyst used, hours | 3 | 9 | 14 | ¹17 | 6 | ¹11 | 7 | 5 | ¹7.5 | 6 | 8 | |
| H₂O crude ratio | 6.8 | 6.8 | 5.4 | 5.7 | 5.5 | 5.5 | 4.0 | 4.1 | 4.7 | 4.5 | 4.5 | |
| LHSV | 0.42 | 0.53 | 0.55 | 0.51 | 0.54 | 0.54 | 0.53 | 0.52 | 0.46 | 0.52 | 0.53 | |
| Condition of reactor | OK | OK | OK | OK | OK | OK | OK | OK | Plug | OK | Plug | |
| Liquid product evaluation: | | | | | | | | | | | | |
| Yield, volume percent | | 88 | (²) | 85 | 98 | 97 | 78 | 70 | 80 | 80 | | 100 |
| °API gravity, 60 F | 31.1 | 28.5 | (²) | 28.8 | 32.5 | 31.0 | 33.5 | 31.5 | 26.5 | 32.2 | | 20.4 |
| Sulfur, weight percent | 2.3 | 2.91 | 3.68 | 3.1 | 2.80 | 3.10 | 3.0 | 2.70 | 3.06 | 2.65 | 3.10 | 4.0 |
| Sulfur removal, percent | 42.5 | 27.2 | 8.0 | 22.4 | 30.0 | 22.4 | 25.0 | 32.5 | 23.5 | 33.8 | 22.5 | |
| Carbon residue, percent | 1.53 | 0.95 | 5.82 | 0.25 | 0.62 | 1.21 | 1.08 | 0.46 | | 0.62 | | 9.07 |
| Nitrogen, weight percent | 0.07 | 0.10 | 0.22 | 0.10 | 0.08 | 0.10 | 0.12 | 0.09 | 0.06 | 0.12 | | 0.22 |
| Gaseous products; Yield, cc./ml. feed | 82 | 42 | | 42 | 65 | 29 | 63 | 117 | 66 | 87 | | |
| Composition, mole percent: | | | | | | | | | | | | |
| H₂ | 82.6 | 32.7 | 33.1 | 33.9 | 36.1 | 17.3 | 37.0 | 49.7 | 28.0 | 24.8 | | |
| H₂S | | | | | 7.2 | 7.5 | 4.2 | 5.1 | 5.9 | 8.5 | | |
| C₁ | 3.9 | 29.1 | 27.3 | 32.8 | 27.7 | 36.7 | 22.4 | 14.0 | 23.8 | 26.8 | | |
| C₂'s | 2.4 | 12.6 | 12.8 | 11.8 | 12.2 | 14.9 | 11.6 | 5.2 | 8.9 | 11.3 | | |
| C₃'s | 0.6 | 4.0 | 5.3 | 4.5 | 6.9 | 9.1 | 8.9 | 2.2 | 4.8 | 7.6 | | |

¹ Catalyst regenerated prior to next run.
² Emulsion formation and actual yield difficult to determine.

Lower gas production rates were obtained with the barium promoted nickel aluminate catalyst and the yields of liquid products were higher. Lower initial reaction temperatures were also observed for the nickel aluminate catalyst promoted with barium.

After an operation period of 15½ hours, the surface area of the alumina base catalyst had decreased from 53.9 to 41.5 m.² per gram. The nickel aluminate, on the other hand, changed from 78.5 to 58.9 m.² per gram after a total of 41 hours. These results indicate that longer life and higher activity can be expected for the barium promoted nickel aluminate catalyst.

We claim:

1. A process for the conversion of heavy hydrocarbon-containing feedstocks comprising heavy hydrocarbon oils, such as crude and residual oil fractions and sulfur-containing crude and residual oil fractions to useful gaseous and liquid products which comprises contacting a heavy hydrocarbon-containing feedstock and steam at a temperature in the range 600–1000° F. and a water to hydrocarbon liquid volume ratio in the range 0.1/1 to 1/1 with a nickel aluminate spinel ($NiAl_2O_4$) catalyst treated with at least one weight percent of barium resulting from the decomposition of a barium salt of an organic acid.

2. A process according to claim 1 wherein the treated catalyst contains from 1 to 10 weight percent barium.

3. A process according to claim 1 wherein said barium salt is barium acetate, said hydrocarbon-containing feedstock is a sulfur-containing crude oil and said contacting is carried out at a temperature in the range 600–1000° F., a reaction pressure of 200–3000 p.s.i.g., a water to hydrocarbon liquid volume ratio in the range 0.1/1 to 1/1, and a total liquid hourly space velocity (LHSV) ranging from 0.2 to 10 volumes of liquid feed per volume of catalyst per hour.

References Cited

UNITED STATES PATENTS

| | | | |
|---|---|---|---|
| 3,291,564 | 12/1966 | Kearby | 252—475 |
| 3,320,182 | 5/1967 | Taylor et al. | 252—466 |
| 3,394,086 | 7/1968 | Taylor et al. | 252—466 |
| 3,396,124 | 8/1968 | Taylor et al. | 252—466 |
| 3,421,870 | 1/1969 | Sinfelt et al. | 252—466 |
| 3,423,194 | 1/1969 | Kearby | 252—466 |

HERBERT LEVINE, Primary Examiner

U.S. Cl. X.R.

48—214; 208—214, 226, 244; 252—466, 475